US008070397B2

(12) United States Patent
Durfee

(10) Patent No.: US 8,070,397 B2
(45) Date of Patent: Dec. 6, 2011

(54) SELF FEED BIT

(75) Inventor: LaVerne R. Durfee, Harmony, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 961 days.

(21) Appl. No.: 12/033,056

(22) Filed: Feb. 19, 2008

(65) Prior Publication Data

US 2009/0208300 A1 Aug. 20, 2009

(51) Int. Cl.
*B23B 51/00* (2006.01)

(52) U.S. Cl. ......................... 408/213; 408/225; 408/227

(58) Field of Classification Search .................. 408/213, 408/214, 223–225, 227; *B23B 51/00*
See application file for complete search history.

(56) References Cited

U.S. PATENT DOCUMENTS

| | | | | | |
|---|---|---|---|---|---|
| 285,440 | A | | 9/1883 | Swan | |
| 444,956 | A | | 1/1891 | Jones | |
| 458,640 | A | | 9/1891 | Phillips | |
| 1,139,198 | A | * | 5/1915 | Lund | 408/208 |
| 1,140,988 | A | * | 5/1915 | Kunitz | 408/212 |
| 1,185,380 | A | * | 5/1916 | Davis | 408/205 |
| 1,389,578 | A | | 9/1921 | Charlton | |
| 1,410,534 | A | * | 3/1922 | Stein | 408/212 |
| 1,493,439 | A | | 5/1924 | Steadman | |
| 1,557,900 | A | | 10/1925 | Thompson | |
| 1,887,374 | A | | 11/1932 | Emmons | |
| RE19,182 | E | | 5/1934 | Emmons | |
| 2,168,060 | A | | 8/1939 | Catland | |
| 2,325,535 | A | | 7/1943 | Nordberg | |
| 2,346,546 | A | | 4/1944 | Anderson | |
| 2,445,480 | A | | 7/1948 | Gantt | |
| 2,575,239 | A | | 11/1951 | Stephens | |
| 2,576,376 | A | | 11/1951 | Wilson | |
| 2,577,987 | A | * | 12/1951 | Wilson | 408/213 |
| 2,578,351 | A | | 12/1951 | Griffiths | |
| 2,590,053 | A | | 3/1952 | Taylor | |
| 2,593,823 | A | * | 4/1952 | Wilson | 408/213 |
| 2,595,368 | A | | 5/1952 | Plautz | |
| 2,673,714 | A | | 3/1954 | Hargrave | |
| 2,692,627 | A | | 10/1954 | Stearns | |

(Continued)

FOREIGN PATENT DOCUMENTS

DE 871579 3/1953

(Continued)

OTHER PUBLICATIONS

GB Intellectual Property Office, Examination Report for Application No. GB0800323.8, dated May 19, 2010.

(Continued)

*Primary Examiner* — Eric A Gates
(74) *Attorney, Agent, or Firm* — Dennis J. Williamson; Moore & Van Allen, PLLC

(57) ABSTRACT

The self feeding drill bit comprises a shank that has one end adapted to be connected to a chuck of a rotary tool such as a drill or power driver. The opposite end of the shank supports a cutting member where the cutting member is a cup shaped member having a series of teeth formed on the edge thereof. A screw tip is provided for feeding the cutting member into and through the wood. A removable cutting blade is provided for boring the interior of the hole. A kit including a self feed bit and a plurality of replacement bits is also provided.

10 Claims, 4 Drawing Sheets

U.S. PATENT DOCUMENTS

| | | | | | |
|---|---|---|---|---|---|
| 2,794,468 | A | | 6/1957 | Huxtable | |
| 2,812,791 | A | * | 11/1957 | Mackey | 408/212 |
| 2,835,293 | A | * | 5/1958 | Mackey | 408/200 |
| 2,858,718 | A | | 11/1958 | Kohler | |
| 2,867,137 | A | | 1/1959 | Joy | |
| 3,006,424 | A | | 10/1961 | Dahlin et al. | |
| 3,008,359 | A | * | 11/1961 | Mackey | 408/115 R |
| 3,049,033 | A | | 8/1962 | Benjamin et al. | |
| 3,076,357 | A | | 2/1963 | Benjamin et al. | |
| 3,085,453 | A | | 4/1963 | Mossberg | |
| 3,163,244 | A | | 12/1964 | Zimmerman | |
| 3,165,131 | A | * | 1/1965 | Mackey | 408/201 |
| 3,169,417 | A | | 2/1965 | Andreasson | |
| 3,216,107 | A | | 11/1965 | Andreasson | |
| 3,359,837 | A | | 12/1967 | Andreasson | |
| 3,362,802 | A | | 1/1968 | Ellis | |
| 3,436,990 | A | | 4/1969 | Tourison | |
| 3,548,688 | A | | 12/1970 | Kuch | |
| 3,555,935 | A | | 1/1971 | Dorrenberg | |
| 3,824,026 | A | | 7/1974 | Gaskins | |
| 3,920,350 | A | | 11/1975 | Southall | |
| 4,008,976 | A | | 2/1977 | Holzl | |
| 4,060,335 | A | | 11/1977 | Holloway et al. | |
| 4,090,807 | A | * | 5/1978 | Stewart | 408/213 |
| 4,134,706 | A | | 1/1979 | Stewart | |
| 4,160,616 | A | | 7/1979 | Winblad | |
| 4,225,274 | A | * | 9/1980 | Katz | 408/225 |
| 4,239,427 | A | * | 12/1980 | Walton, II | 408/213 |
| 4,244,667 | A | * | 1/1981 | Timmons | 408/201 |
| 4,286,904 | A | | 9/1981 | Porter et al. | |
| 4,383,784 | A | | 5/1983 | Gulbrandsen | |
| 4,488,840 | A | | 12/1984 | Pollington | |
| 4,536,107 | A | | 8/1985 | Sandy et al. | |
| 4,583,888 | A | | 4/1986 | Mori et al. | |
| 4,595,067 | A | | 6/1986 | Drake | |
| 4,625,593 | A | | 12/1986 | Schmotzer | |
| 4,645,389 | A | | 2/1987 | Maier | |
| 4,704,055 | A | | 11/1987 | Guhring | |
| 4,728,231 | A | | 3/1988 | Kunimori et al. | |
| 4,748,876 | A | | 6/1988 | Solf et al. | |
| 4,762,445 | A | | 8/1988 | Bunting et al. | |
| 4,880,707 | A | | 11/1989 | Kohno et al. | |
| 4,968,193 | A | | 11/1990 | Chaconas et al. | |
| 5,193,951 | A | | 3/1993 | Schimke | |
| 5,228,812 | A | | 7/1993 | Noguchi et al. | |
| 5,273,379 | A | | 12/1993 | Nishimura | |
| 5,466,100 | A | | 11/1995 | Ahluwalia | |
| 5,492,187 | A | | 2/1996 | Neukirchen et al. | |
| D376,809 | S | | 12/1996 | Stone et al. | |
| 5,611,251 | A | | 3/1997 | Katayama | |
| 5,700,113 | A | | 12/1997 | Stone et al. | |
| 5,820,319 | A | | 10/1998 | Hull et al. | |
| 5,855,458 | A | | 1/1999 | Reynolds et al. | |
| 5,957,634 | A | * | 9/1999 | Carpinetti | 408/226 |
| 5,975,813 | A | | 11/1999 | Schmotzer | |
| 5,988,953 | A | | 11/1999 | Berglund et al. | |
| 6,029,544 | A | | 2/2000 | Katayama | |
| 6,050,754 | A | | 4/2000 | Thomas | |
| 6,129,162 | A | | 10/2000 | Hauptmann | |
| 6,345,940 | B2 | | 2/2002 | Anjanappa et al. | |
| 6,354,773 | B1 | * | 3/2002 | Konen | 408/213 |
| 6,361,255 | B1 | | 3/2002 | Schmotzer | |
| 6,371,702 | B1 | | 4/2002 | DeWald, Jr. et al. | |
| 6,428,250 | B2 | | 8/2002 | Giebmanns | |
| 6,431,295 | B1 | | 8/2002 | Kleine et al. | |
| 6,443,674 | B1 | | 9/2002 | Jaconi | |
| 6,485,235 | B1 | | 11/2002 | Mast et al. | |
| 6,499,919 | B2 | * | 12/2002 | Feld | 408/213 |
| 6,551,035 | B1 | | 4/2003 | Bruhn et al. | |
| 6,652,202 | B2 | * | 11/2003 | Remke et al. | 408/214 |
| 6,742,610 | B2 | | 6/2004 | Peetz | |
| 6,874,978 | B2 | * | 4/2005 | Gongola | 408/144 |
| 7,246,975 | B2 | * | 7/2007 | Corso et al. | 408/206 |
| D575,808 | S | * | 8/2008 | Zeiler et al. | D15/139 |
| 7,513,320 | B2 | | 4/2009 | Mirchandani et al. | |
| 7,625,160 | B2 | * | 12/2009 | Zeiler et al. | 408/213 |
| 7,661,911 | B2 | * | 2/2010 | Zeiler et al. | 408/1 R |
| 2001/0013429 | A1 | | 8/2001 | Hauptmann et al. | |
| 2002/0046885 | A1 | | 4/2002 | Eichhorn et al. | |
| 2002/0141839 | A1 | | 10/2002 | McKinley et al. | |
| 2002/0159851 | A1 | | 10/2002 | Krenzer | |
| 2002/0168239 | A1 | | 11/2002 | Mast et al. | |
| 2002/0172569 | A1 | | 11/2002 | Nakamura | |
| 2003/0035694 | A1 | | 2/2003 | Liao | |
| 2003/0068209 | A1 | | 4/2003 | Leibhard et al. | |
| 2004/0156689 | A1 | | 8/2004 | Shen | |
| 2004/0208716 | A1 | | 10/2004 | Krenzer | |
| 2004/0258493 | A1 | | 12/2004 | Sugano et al. | |
| 2005/0135888 | A1 | | 6/2005 | Stokey et al. | |
| 2005/0169720 | A1 | | 8/2005 | Kobayashi | |
| 2005/0249563 | A1 | | 11/2005 | Scott et al. | |
| 2006/0056930 | A1 | | 3/2006 | Rompel | |
| 2008/0166194 | A1 | | 7/2008 | Durfee | |
| 2010/0003094 | A1 | | 1/2010 | Durfee | |
| 2010/0307640 | A1 | | 12/2010 | Durfee et al. | |

FOREIGN PATENT DOCUMENTS

| | | | | |
|---|---|---|---|---|
| DE | 3738000 | A1 | * | 5/1989 |
| DE | 29701161 | U1 | * | 5/1998 |
| DE | 10220021 | A1 | | 11/2003 |
| FR | 2617753 | A | | 1/1989 |
| FR | 2910364 | A3 | | 6/2008 |
| GB | 1079352 | | | 8/1967 |
| GB | 1151166 | | | 5/1969 |
| GB | 1360221 | | | 7/1974 |
| GB | 1542219 | | | 3/1979 |
| GB | 2431368 | | | 4/2007 |
| JP | 52050906 | A | | 4/1977 |
| WO | 2007099349 | A2 | | 9/2007 |

OTHER PUBLICATIONS

GB Intellectual Property Office, Examination Report for Application No. GB0800323.8, dated Oct. 4, 2010.

Chilean Patent and Trademark Office; Office Action for Chilean Patent Application No. 48-2008; dated Oct. 22, 2010.

Swedish Patent and Trademark Office PRV, Opinion, Oct. 1, 2008.

* cited by examiner

SELF FEED BIT

The invention relates to self feed bits and more particularly to a self feed bit having a replaceable cutting edge.

Self feed bits for cutting large diameter holes in wood for pipe, conduit and other applications are known. These types of bits include a shank that has one end adapted to be connected to a chuck of a rotary tool such as a drill or power driver. The opposite end of the shank supports a cutting head having an annular cutting edge. A screw tip is provided for feeding the cutting member into and through the wood. A cutting member is disposed between the cutting edge of the and the tip. The bit is rotated at high speed such that the teeth score the edge of the hole and the cutting member bores the interior of the hole.

While various types of drill bits are known, an improved bit with a replaceable tip is desired.

SUMMARY

The self feeding drill bit comprises a shank that has one end adapted to be connected to a chuck of a rotary tool such as a drill or power driver. The opposite end of the shank supports a cutting member where the cutting member is a cup shaped member having a series of teeth formed on the edge thereof. A screw tip is provided for feeding the cutting member into and through the wood. A removable cutting blade is provided for boring the interior of the hole. A kit including a self feed bit and a plurality of replacement bits is also provided.

DETAILED DESCRIPTION OF EMBODIMENTS OF THE INVENTION

Figure 1:
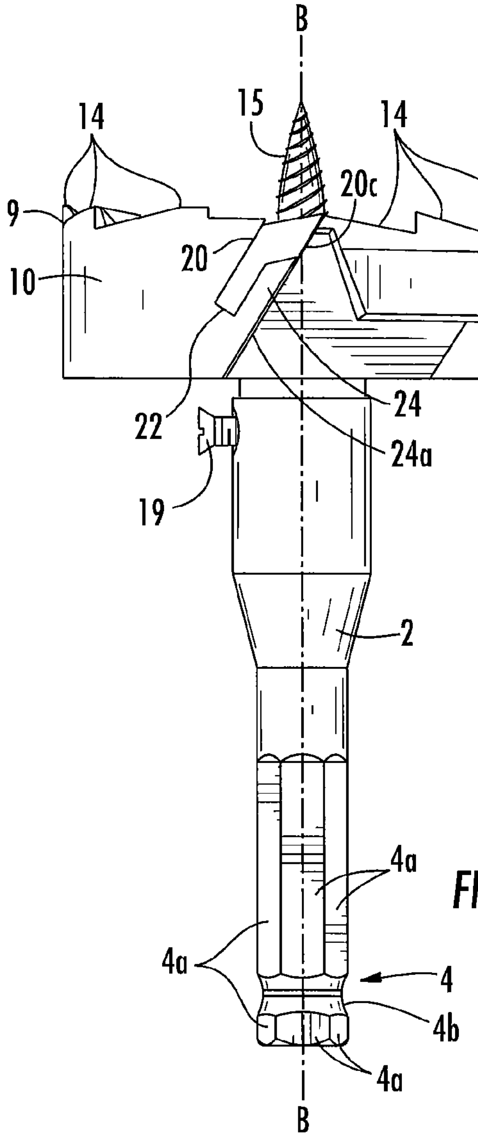
FIG. 1 is a side view of one embodiment of the drill bit of the invention.

Referring to the Figures an embodiment of a drill bit is shown generally at 1 and comprises a shank 2 having a quick coupling 4 disposed at a first end thereof. The quick connect coupling 4 may comprise a plurality flat faces 4*a* adapted to be received and retained in a chuck of a rotary tool such as a screwdriver or power driver. A recess 4*b* may be formed around the circumference of the shank to be releasably engaged by the quick connect coupler of the rotary tool. Other configurations of shank 2 may also be used for coupling the drill bit to a rotary drive tool.

A cylindrical, cup shaped cutting head 6 is formed on the opposite end of shank 2 from quick connect coupling 4. The cutting head 6 comprises an annular flange 10 connected to shank 2 by a round base 12. Formed on the distal edge 9 of the flange 10 are a plurality of teeth 14 that create an annular cutting edge. When the drill bit is rotated about the rotational axis B-B the teeth 14 score the material being cut to create a clean cut around the periphery of the hole being drilled. A screw tip 15 is formed along the rotational axis B-B of the bit that engages the material being cut to feed the bit through the material.

Figure 1A:
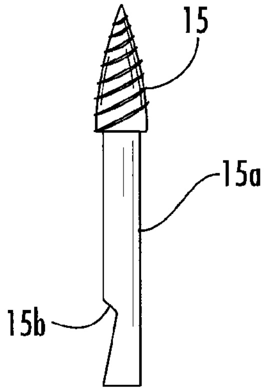
FIG. 1A shows the screw tip used in the embodiment of FIG. 1.
Figure 2:
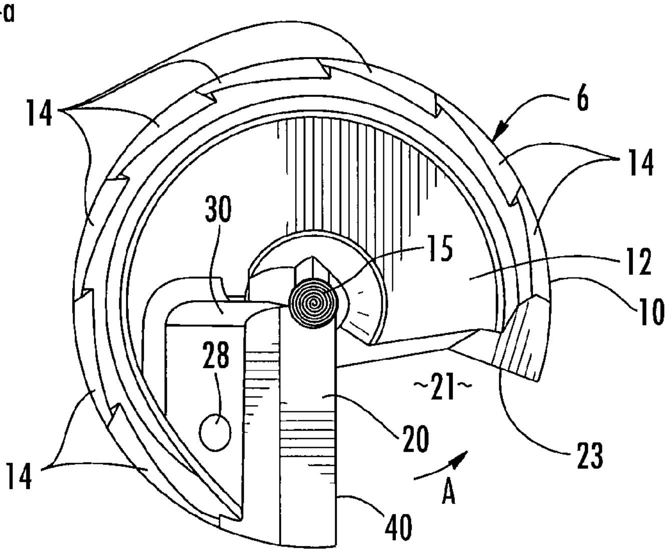
FIG. 2 is a top view of the embodiment of the drill bit of FIG. 1.
Figure 3:
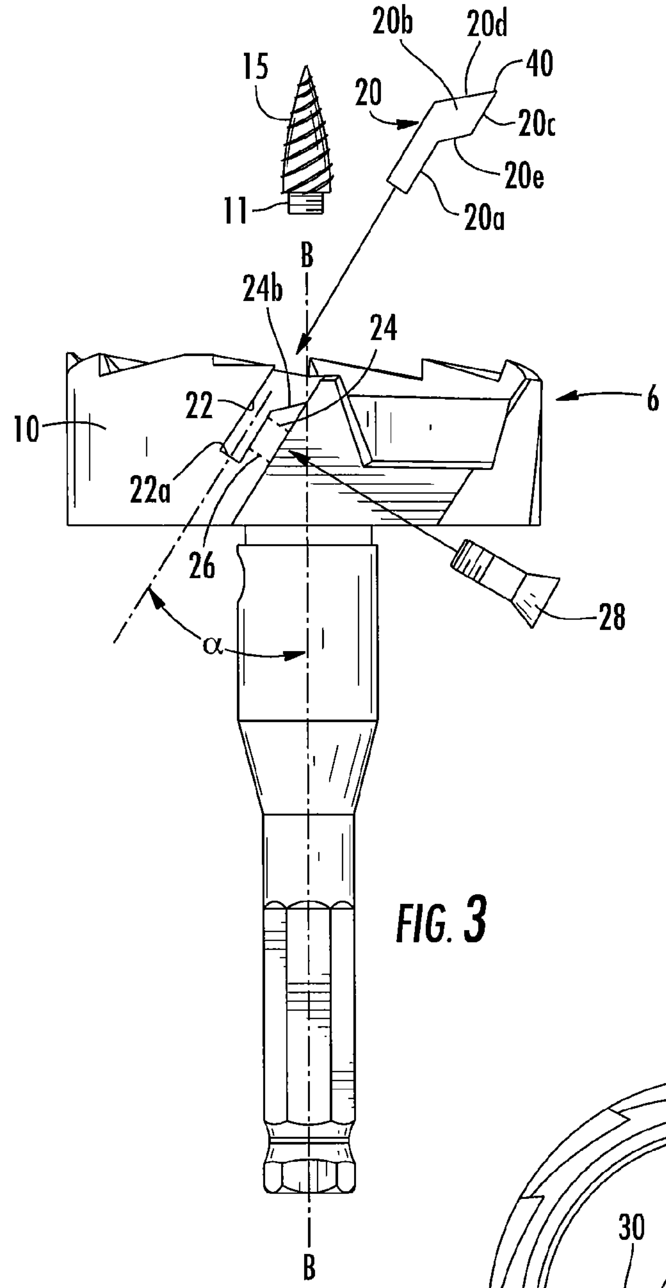
FIG. 3 is an exploded side view of the embodiment of the drill bit of FIG. 1 with the screw tip removed.
Figure 4:
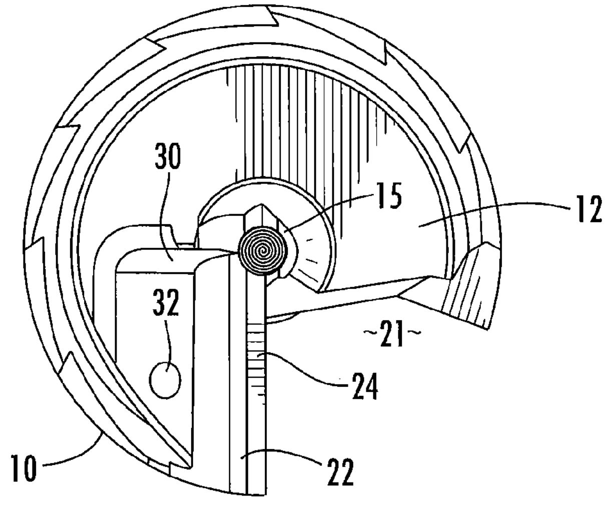
FIG. 4 is a top view of the embodiment of the drill bit of FIG. 1 with the cutting blade removed.
Figure 5:
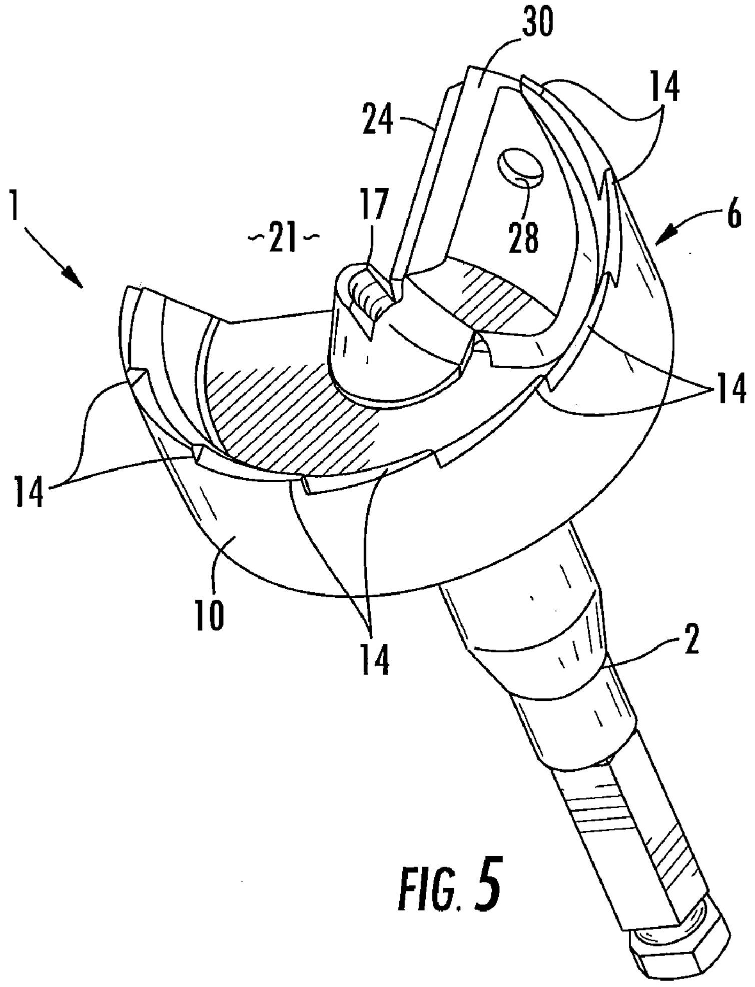
FIG. 5 is a perspective view of the embodiment of the drill bit of FIG. 1 with the cutting blade and screw tip removed.
Figure 6:
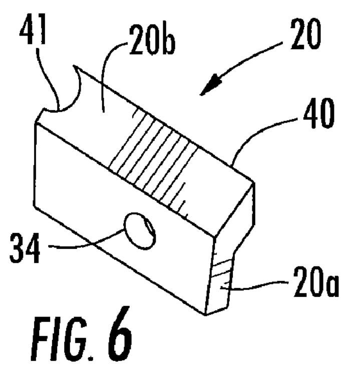
FIG. 6 is a perspective view of the removable cutting member used in the embodiment of the drill bit of FIG. 1.

The screw tip 15 may be made removable from the remainder of the bit. The screw tip 15 may include a relatively long stem 15*a* as shown in FIG. 1A that extends into an axially aligned bore in the cutting head 6 and shank 2. A set screw 19 engages a notch 15*b* in the stem 15*a* to retain the screw tip 15 in place. In an alternate embodiment, the screw tip 15 may include external screw threads 11 that mate with internal screw threads 17 on the bit to allow the screw tip 15 to be inserted on or removed from the bit as best shown in FIGS. 3 and 5.

A cutting blade or lifter 20 is releasably secured to the cutting head 6. When the drill bit is rotated at high speed in the direction of arrow A, the cutting blade 20 lifts the material from the interior of the hole being drilled. A trough 21 is formed in wall 10 and base 12 in front of the cutting blade 20 to create an open area for the wood chips to be ejected from the drill bit during a drilling operation. Trough 21 is created by a gap 23 formed in the base 12 and a coextensive gap 25 formed in flange 10. Trough is located in front of the leading edge of cutting blade 20, the leading edge being the forward edge of the blade 20 as the blade rotates in the direction of arrow A.

The cutting blade 20, from repeated use and/or from striking an obstruction, can become dull or damaged. The cutting blade 20 can be easily removed and replaced such that when the cutting blade becomes dull or is damaged, the blade 20 can be replaced in the field by the user with minimum difficulty and lost time. To removably support the cutting blade, a slot 22 formed by front wall 24 and back wall 30 is formed in the cutting head 6. In the axial direction of bit 1, the front wall 24 terminates short of the distal edge 9 of the cutting head 6. In the radial direction of the bit 1, the front wall 24 extends from substantially the center of the cutting head 6 adjacent the screw 15 to the wall 10. Front wall 24 includes a through hole 26 for receiving a fastener such as screw 28. Slot 22 is formed at an acute angle a relative to the axis of the bit.

In the radial direction, the back wall 30 extends from the wall 10 to a line extending through the center of cutting head 6 arranged perpendicular to the cutting blade 20. In the axial direction the back wall extends to the distal edge 9. The back wall 30 is made thick enough to support the forces exerted on the cutting blade 20 during the cutting operation. The back wall 30 includes a threaded hole 32 for receiving fastener 28 such that the fastener may be threaded into engagement with the back wall 30.

The cutting blade 20 includes a first portion 20*a* that is received in the slot 22. The first portion 20*a* is dimensioned to be closely received in the slot 22 such that it is prevented from wobbling. A through hole 34 is formed in the first portion that receives the screw 28 to fix the cutting blade in the slot. The cutting blade 20 includes a second portion 20*b* that has a cutting edge 40 formed at the leading edge thereof between the leading face 20*c* and the top face 20*d* of the cutting blade. The second portion 20*b* extends from the slot 22 such that the cutting edge 40 is disposed at the distal end of cutting head 6 approximately in the same plane as the cutting edges of teeth 14. The cutting blade 20 and cutting edge 40 extend from the outer periphery of cutting head 6 to the center of the cutting head. The cutting blade includes a semi circular recess 41 formed at the interior edge thereof for receiving the proximal end 15a of lead screw 15 and the distal end 2a of shank 2 such that the cutting edge 20 extends beyond the periphery of the lead screw 15.

The leading face 20c of the cutting blade 20 is disposed such that it is coplanar with the leading face 24a of front wall 24. Further the bottom face 20e of cutting blade 20 abuts the top face 24b of front wall 24. The bottom wall 20f of blade 20 rests on the bottom wall 22a of slot 22.

In use a cutting blade 20 is inserted into the slot 22 such that the cutting blade is closely received between the front wall 24 and the rear wall 30. The screw 28 is inserted through the front wall 24 and cutting blade 20 and is threadably connected to the back wall 30 to retain the blade 20 in the slot 22. The bit 1 can then be used to cut holes including large diameter holes.

When the bit is rotated the screw thread 15 feeds the bit 1 through the material being cut, the teeth 14 score the circumference of the hole being cut to create a smooth edge and the cutting blade 20 cuts or lifts material from the interior of the hole being cut. It will be appreciated that the cutting edge 40 of cutting blade 20 can become dull or damaged during use. In such an event the user can simply remove the dull or damaged blade by unthreading the screw 28 and sliding the cutting blade from the slot 22. A replacement blade is then inserted into the slot 22 and the screw 28 is threaded back into engagement with the rear wall 30. The replacement of the cutting blade can be performed quickly in the field by the end user and does not require any specialized tools. The cutting blade 20 can be replaced cheaply and quickly without requiring the disposal of the entire bit or the time loss required to resharpen a dull cutting edge.

Figure 7:
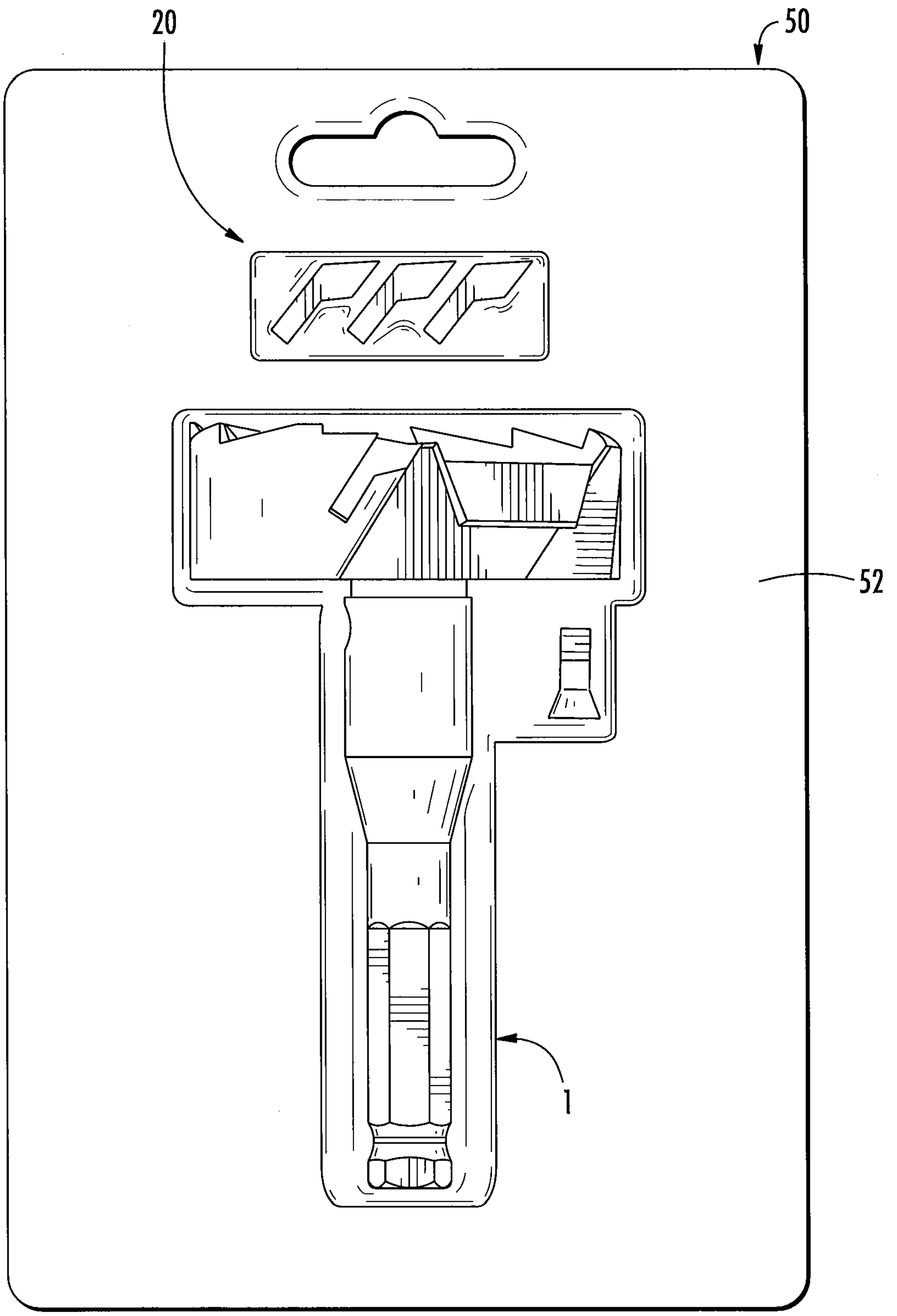
FIG. 7 is a front view of a kit showing the drill and a plurality of replacement cutting blades in a package.

Referring to FIG. 7 the drill bit 1 and a plurality of replacement bits 20 may be sold as part of a kit 50. The kit may include a package 52 such as a disposable shrink wrap package, blister package, a reuseable molded plastic case or the like. The user can then easily replace a damaged or dull cutting blade and replace it with another bit from the kit. Further, the different bits may be identical to one another or may have different constructions for different applications.

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

The invention claimed is:

1. A drill bit comprising:

a shank defining an axis of rotation;

a screw tip having a periphery arranged along said axis of rotation;

a cutting head attached to said shank, said cutting head comprising an annular wall positioned about the axis of rotation and at least one tooth arranged on the distal end of the annular wall and a slot formed in the cutting head for releasably retaining a cutting blade, the slot formed by a front wall and a back wall, the front wall extending from adjacent the screw tip to the annular wall and defining a leading face, the front wall terminating short of the distal end of the annular wall, a first hole being formed in the front wall for receiving a fastener, and the back wall extending from the annular wall to a line extending through the center of the cutting head arranged perpendicular to the cutting blade, the back wall extending to the distal end of the annular wall, the back wall comprising a threaded hole for threadably receiving the fastener, the slot being formed at an acute angle relative to the axis of rotation; and the cutting blade being removably mounted in the slot and comprising a first portion that is closely received in the slot and that comprises a second hole for receiving the fastener and a second portion that comprises a cutting edge, the second portion extending from the slot where the cutting blade includes a recess for receiving the screw tip such that the cutting edge extends beyond the periphery of the screw tip, said second portion comprising a second leading face that is disposed such that the second leading face of the second portion is coplanar with the leading face of the front wall.

2. The drill bit of claim 1 wherein the fastener comprises a screw.

3. The drill bit of claim 2 wherein said screw passes through the second hole formed in the cutting blade and threadably engages the threaded hole.

4. The drill bit of claim 1 wherein said cutting edge is in approximately the same plane as said at least one tooth.

5. The drill bit of claim 1 wherein said shank includes a quick release coupling.

6. The drill bit of claim 1 wherein said cutting blade includes at least three faces, said slot engaging the at least three faces of said cutting blade.

7. The drill bit of claim 1 wherein said cutting blade at least partially circumscribes said screw.

8. The drill bit of claim 1 further including a trough in front of said cutting blade.

9. The drill bit of claim 1 wherein said screw tip is removably attached to said cutting head.

10. A drill bit kit comprising:

a drill bit comprising:

a shank defining an axis of rotation;

a screw tip having a periphery arranged along said axis of rotation;

a cutting head attached to said shank, said cutting head comprising an annular wall positioned about the axis of rotation and at least one tooth arranged on the distal end of the annular wall and a slot formed in the cutting head for releasably retaining a cutting blade, the slot formed by a front wall and a back wall, the front wall extending from adjacent the screw to the annular wall and defining a leading face, the front wall terminating short of the distal end of the annular wall, a first hole being formed in the front wall for receiving a fastener, and the back wall extending from the annular wall to a line extending through the center of the cutting head arranged perpendicular to the cutting blade, the back wall extending to the distal end of the annular wall, the back wall comprising a threaded hole for threadably receiving the fastener, the slot being formed at an acute angle relative to the axis of rotation;

a plurality of cutting blades, each of the plurality of cutting blades comprising a first portion that is closely received in the slot and that comprises a second hole for receiving the fastener and a second portion that comprises a cutting edge that extends from the slot and a recess for receiving the screw tip such that the cutting edge extends beyond the periphery of the screw tip, said second portion comprising a second leading face that is disposed such that the second leading face of the second portion is coplanar with the leading face of the front wall; and a fastener for securing one of said plurality of cutting blades in the slot.

* * * * *